SIGNAL SYSTEM INCLUDING A DIODE LIMITER

Filed Dec. 8, 1954

United States Patent Office 2,964,650

Patented Dec. 13, 1960

2,964,650

SIGNAL SYSTEM INCLUDING A DIODE LIMITER

Arthur J. Radcliffe, Jr., La Grange, and Arthur R. Denz, Chicago, Ill., assignors to International Telephone and Telegraph Corporation, New York, N.Y., a corporation of Maryland Filed Dec. 8, 1954, Ser. No. 473,989

3 Claims. (Cl. 307—88.5)

This invention relates to a signal system including a diode limiter. Its object is to provide a signal system capable of satisfactorily employing a signal amplifier of limited range of signal strength where the incoming signals have a substantially greater range in signal strength.

Heretofore, it has been common practice to use vacuum tubes when it is desired to amplify signals received over a signal line. In many situations, it is desirable to use transistors instead of vacuum tubes because of such advantages as reduced space and power requirements. But, since its input power capacity is very limited, a transistor used as a line amplifier is likely to be damaged or completely ruined if the input signals are subject to wide variations in strength above a selected threshold value. If simple signal-reducing means, such as dropping resistors or a step down transformer, are used, to drop the high signal values to values tolerable to the transistor, the low-level signals are thereby dropped below the selected threshold value.

According to the invention, a selective signal-reducing device, preferably in the form of a pair of oppositely connected diodes, is connected in the input circuit path of the receiving apparatus, between the line and the transistor line amplifier to reduce the high signal values much more than the low signal values. Variations in signal strength are thereby greatly limited, while the sensitivity required for low-level signals is maintained.

In the preferred form of the invention, diodes such as of the germanium-junction type, which have a low inverse resistance at signal strengths near the threshold value and a very high inverse resistance at substantially higher signal strengths, are connected serially and in series opposition in the input circuit. In a modified form, the invention includes two suitable reversely connected diodes shunted across the input path to the transistor line amplifier.

The foregoing and other objects and features of this invention and the manner of attaining them will become more apparent and the invention itself will be best understood, by reference to the following description of an embodiment of the invention taken in conjunction with the accompanying drawings comprising Figs. 1 to 3, wherein.

*Fig. 1—General arrangement*

Figures 1, 2, 3:
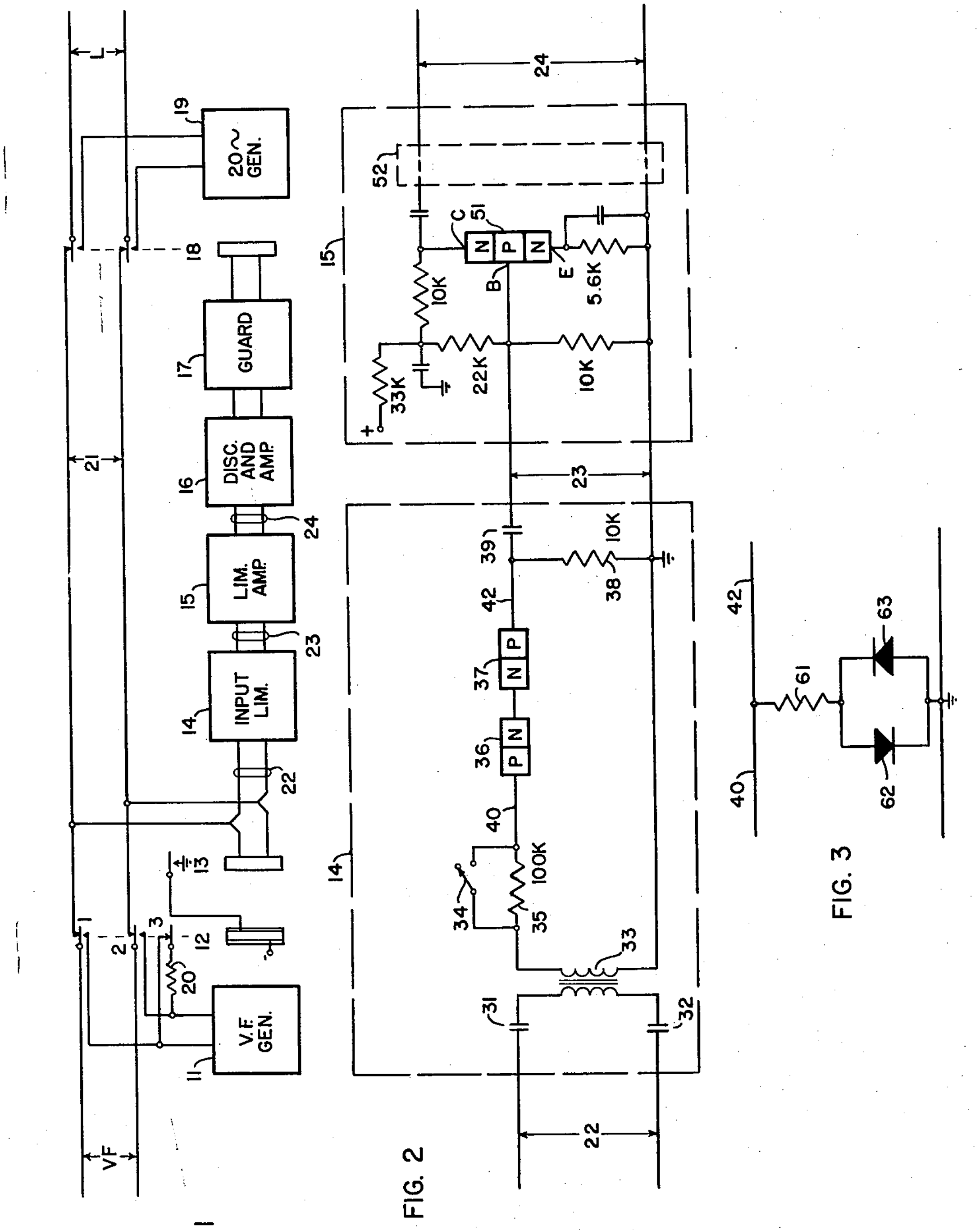
Fig. 1 shows a signal converter between a local telephone or telegraph line, and a voice frequency line.
Fig. 2 shows the input limiter in circuit detail.
Fig. 3 shows an alternative form of the input limiter.

A line VF, which will pass voice frequencies but not low frequency signals, is shown connected through contacts of relay 12, link 21, and contacts of relay 18 to local line L, which will pass both voice frequencies and low frequency signals. Ringing and like signals received from line VF at a frequency within the voice frequency range are connected by path 22 to input limiter 14 and limiter amplifier 15, and converted to direct current and amplified by discriminator and amplifier 16. The guard circuit 17 prevents response to short bursts of signal at the ringing frequency. If the ringing signal persists for a short period, guard circuit 17 operates and closes a circuit for relay 18. At the front contacts of relay 18, twenty-cycle ringing current from generator 19 is connected to local line L.

When low frequency ringing signals are received from line L, relays 13 and 12 operate. At the front contacts 1 and 2 of relay 12 voice frequency ringing signals from generator 11 are connected to line VF. At contacts 3 of relay 12, the loading resistor 20 is disconnected from across the output of generator 11.

*Fig. 2—Input limiter circuit*

The input limiter 14 between wire pair 22 and limiter amplifier 15 is shown in detail in Fig. 2. The condensers 31 and 32 present a high impedance to the low frequency ringing current signals from line L, and thus help to limit the level of these signals reaching limiter amplifier 15. Transformer 33 is used for coupling signals to the input circuit, and for matching impedance. Switch 34 and resistor 35 are used for sensitivity control, switch 34 being opened for low sensitivity and closed for high sensitivity.

The input signals pass through germanium-junction diodes 36 and 37, which are connected in series opposition between wires 40 and 42. These diodes have the property that at low signal levels of the order of a few millivolts the inverse resistance is low of the order of a thousand ohms each, and at high signal levels of the order of one volt or more, the inverse resistance is high of the order of 100,000 to 1,000,000 ohms. The voice frequency signal input may vary from a few millivolts to one volt, and low frequency ringing current as high as ten volts may be received. Therefore, low level signals are passed with very little attenuation, and high level signals are limited by the high inverse impedance of the diodes.

A bias circuit may be used with the diodes if it is desirable to use different portions of their characteristics.

A shunt resistor 38 is used following the diodes from wire 42 to ground. The signals are coupled through condenser 39 to the base of transistor 51, which is the first stage of the limiter amplifier 15. Additional limiter amplifier stages 52 are used as required.

*Fig. 3—Alternate form*

Fig. 3 shows an alternative form in which diodes 62 and 63 are connected in parallel in opposing directions. They are connected in series with resistor 61 between ground and the wires 40 and 42 shown in Fig. 2, in place of diodes 36 and 37. Diodes 62 and 63 are used which have a relatively high impedance for low level signals. If the signals increase to a certain strength, the diodes will break down and carry a substantial portion of the input current. The resistor 61 is used to allow some current to flow through the emitter diode of transistor 51, sufficient to insure the desired operation of the following circuits.

While we have described above the principles of our invention in connection with specific apparatus, it is to be clearly understood that this description is made only by way of example and not as a limitation to the scope of our invention.

We claim:

1. In combination, a signal line comprising a source of alternating-current signals lying within a signal band and subject to variations in signal strength over a relatively wide range extending upwardly from a threshold value, a signal responsive device and means for operating it responsive to alternating-current signals of any strength within the said range, the same means including a signal-receiving circuit bridged across the signal line and including a signal-amplifying device having an input circuit path, means coupling the input circuit path to the bridged circuit to accept only alternating-current signals from the signal line and for maintaining a portion of the input circuit path free from direct-current currents and direct-current potential drops, the signal-amplifying device being capable of causing the signal responsive device to operate responsive to alternating current signals of a strength at and somewhat above the said threshold value, but being unable to tolerate the higher strengths of input signals over a range of signal strength equal to the first said range, and means including a pair of oppositely directed diodes connected in the said portion of the input circuit path for reducing the variations in said higher signal strength therein, while leaving the amplifier fully capable of response to input signals of the said threshold value, the last said means depending upon the diodes acting selectively on respective half cycles of the signals and including means for causing the signal strength at the amplifier to vary with the alternating-current signal strength on the line throughout the first said range, the said diodes being connected serially and in series opposition in the input circuit path.

2. A combination according to claim 1, wherein the said diodes are of the type having a low inverse resistance at signal strengths near the said threshold value and having a very high inverse resistance at substantially higher signal strengths.

3. A combination according to claim 2, wherein the said diodes are of the germanium junction type.

References Cited in the file of this patent

UNITED STATES PATENTS

| | | |
|---|---|---|
| 1,863,674 | Thorp | June 21, 1932 |
| 1,883,613 | Devol | Oct. 18, 1932 |
| 2,122,748 | Mayer | July 5, 1938 |
| 2,329,558 | Scherbatskoy | Sept. 14, 1943 |
| 2,703,382 | Cleary | Mar. 1, 1955 |
| 2,714,702 | Shockley | Aug. 2, 1955 |
| 2,789,254 | Bodle et al. | Apr. 16, 1957 |
| 2,835,867 | Golden | May 20, 1958 |
| 2,854,651 | Kircher | Sept. 30, 1958 |

FOREIGN PATENTS

| | | |
|---|---|---|
| 165,098 | Australia | July 1, 1954 |